Nov. 10, 1964   M. L. HUFF   3,156,080
COTTON HARVESTER
Filed Jan. 28, 1963
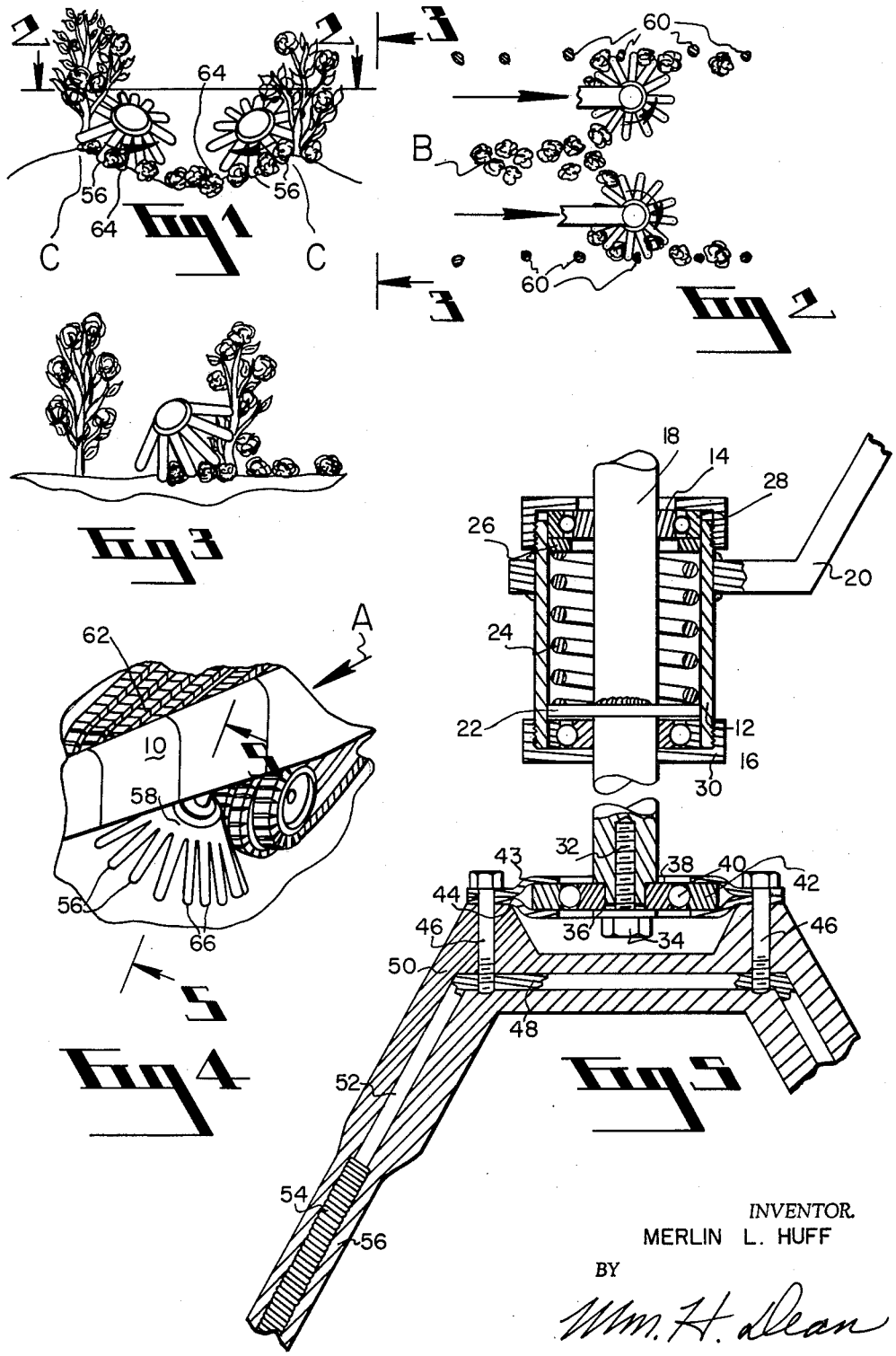
INVENTOR.
MERLIN L. HUFF
BY
Wm. H. Dean United States Patent Office 3,156,080
Patented Nov. 10, 1964

3,156,080
COTTON HARVESTER
Merlin L. Huff, P.O. Box 836, Buckeye, Ariz.
Filed Jan. 28, 1963, Ser. No. 254,053
9 Claims. (Cl. 56—28)

This invention relates to a cotton harvester and more particularly to a cotton harvester which is specifically adapted to operate in the removal of cotton bolls which are on the lowermost limbs of cotton stalks and which have fallen to the ground adjacent thereto; said cotton harvester being disposed to be ground and/or stalk driven and to be used to place bolls of cotton in the middle portions of furrows so that these bolls may be picked up by other harvesting devices utilized to gather cotton from the ground.

It has been a problem with conventional cotton harvesting equipment to pick or gather mature bolls of cotton from the lowermost limbs of cotton plants or stalks and from an area on the ground adjacent thereto and consequently, much cotton is lost due to the inability of conventional equipment to remove the cotton from the ground and from the lowermost portions of cotton plants in close proximity to the plant stalks.

Many machines have been devised for gathering cotton from the ground in furrows between plant rows and various machines, such as conventional spindle machines have been utilized for picking cotton directly from the plants. However, the spindle machines oftentimes knock cotton to the ground, but such cotton falls downwardly among the plant stalks and settles in an area on the ground adjacent or between the plant stalks. The spindle-type machines are unable to pick this cotton and to harvest it. Additionally, various machines which gather cotton from the ground between the plant rows and in the bottoms of furrows are unable to operate closely enough to the cotton plants to remove cotton on the ground directly adjacent the plant or between the plant stalks.

Various prior art devices have been utilized for brushing cotton from the plant stalks and around the areas of the soil adjacent the plant stalks. However, these devices have not been satisfactory due to short life and due to the disturbance of the soil and the creation of a great amount of dust and inclusion of soil in the bolls of cotton. Various power driven devices have thus reduced the grade of cotton by mixing a considerable amount of foreign matter, including trash and soil, into the cotton as it is brushed away from the plant stalks and the ground adjacent thereto.

Accordingly, it is an object of the present invention to provide a cotton harvester having novel resilient fingers which are ground and/or plant driven and which will efficiently remove cotton bolls from cotton plant rows; said cotton being removed from areas between the plant stalks and from the surface of the ground and lower limbs of the stalks without creating a great amount of dust or disturbance of foreign matter and without mixing said dust or foreign matter with the bolls of cotton.

Another object of the invention is to provide a novel cotton harvester which may readily be used in connection with any other harvester for removing bolls of cotton from the ground and/or between the plant stalks adjacent the ground and for placing said cotton so removed in a median portion of a furrow between cotton rows so that conventional machines utilized to pick cotton from the ground may then gather this cotton therefrom.

Another object of the invention is to provide a very efficient and durable cotton harvester adapted for use in removing cotton from the ground and from the lower limbs and areas between cotton plant stalks.

Another object of the invention is to provide a cotton harvester which is very simple and economical to install in connection with various cotton harvesting equipment and which is very efficient and economical to operate in connection with other cotton harvesting machines.

Another object of the present invention is to provide a cotton harvester having a cotton engaging rotor having an annular row of resilient downwardly diverging plant stalk engaging fingers and means freely and rotatably supporting said rotor in position to cause engagement of the fingers with stalks of cotton plants; said fingers being soft rubber-like fingers which do not disturb the ground as they are stalk or ground driven and which will efficiently engage and remove cotton from areas adjacent the surface of the ground and from lower limbs and locations between cotton plant stalks in a cotton plant row.

Further objects and advantages of the invention may be apparent from the following specification, appended claims, and accompanying drawings, in which:

FIG. 1 is a diagrammatic view illustrating a cross section of a furrow and rows of cotton plants at opposite sides thereof together with cotton engaging rotors of the present invention shown in plant driven position and shown removing cotton bolls from positions adjacent the ground and between the plant stalks;

FIG. 2 is a top or plan view of the disclosure of FIG. 1 showing the view rotated substantially 90 degrees from that as shown in FIG. 1;

FIG. 3 is a side elevational view taken from the line 3—3 of FIG. 1;

FIG. 4 is a perspective view of the cotton harvester of the present invention mounted on a vehicle and followed by a conventional cotton harvesting machine adapted to gather cotton from the surface of the ground; and FIG. 5 is an enlarged fragmentary sectional view taken from the line 5—5 of FIG. 4 showing details of the cotton engaging rotor of the invention and its bearing means which provides a freely rotating support therefor.

As shown in the drawings, the cotton harvester of the present invention may include a vehicle 10, as indicated in FIG. 4 of the drawings. This vehicle may be a tractor drawn vehicle. It may be a powered vehicle, or may be a part of a conventional cotton harvester. This vehicle is adapted to move longitudinally of cotton plant rows and supported on the vehicle is a bearing housing 12 supporting bearings 14 and 16 carrying a shaft 18 rotatably therein.

Secured to the housingg 12 is a bracket 20 adapted to support it in connection with the vehicle 10 in a position as will be hereinafter described in detail.

The shaft 18 is provided with a collar 22 thereon which moves upwardly and downwardly in the casing 12 and this collar 22 is normally urged downwardly by a spring 24 mounted in the housing 12 and engaging a ring 26 at its opposite end. The bearings 14 and 16 are held in opposite ends of the casing 12 by retainers 28 and 30 screwthreadably connected to opposite ends of the casing 12.

The lower end of the shaft 18 is provided with an internally screwthreaded hole 32 engaged by a screw 34 having a head engaging a washer 36 clamped to an inner race 38 of a bearing 40. The outer race 42 of this bearing 40 is held in clamp plates 43 and 44 by means of clamp screws 46. The clamp screws 46 are screwthreaded into a plate 48 which is cast into a rubber or rubber-like material 50. Secured to the plate 48 are rods 52 which extend downwardly in a diverging annular row. Fixed to these rods 52 are coil springs 54 and cast around the coil springs 54 are rubber-like fingers 56. The fingers 56 and material 50 are cast integral and all surround the plate 48, rods 52 and springs 54.

It will be seen that the cotton harvesting rotor 58, hereinbefore described, comprises a plurality of the fingers 56 which extend downwardly in a diverging annular row and which are supported by the bearing 40 which is freely rotatable about the shaft 18 and that the shaft 18 is axially movable by slidable movement in the inner races of the bearings 14 and 16 and that the spring 24 provides slight downward resilient loading of the fingers 56 into areas between stalks 60 of plants, as shown best in FIG. 2 of the drawings. As the vehicle 10 moves along, as for example, in the direction of the arrow A in FIG. 4 of the drawings, the fingers 56 are engaged between the plant stalks 60 and this causes rotation of the fingers. As they move between the plant stalks, they engage bolls of cotton and transfer them outwardly into a median area B, as indicated in FIG. 2 of the drawings, whereupon a conventional pick-up belt structure 62 of a conventional harvesting machine may follow and pick up the cotton from the ground or from a central furrow area.

It will be seen from FIGS. 1, 3, and 4 of the drawings, that the pivotal axes of the bearings 40 and shafts 18 are tilted backward with respect to direction of the arrow A, or the forward direction of the vehicle 10 and that these axes are also tilted laterally of each plant row C, as indicated in FIG. 1 of the drawings, so that the fingers 56, when ground driven, will engage between the stalks 60 and also will traverse an inclined portion of the soil furrow 64 adjacent each plant row.

Accordingly, it will be appreciated that the cotton harvester of the present invention, with its soft resilient fingers, moves between the stalks of a plant row and is driven thereby and rotated about the axis of the bearings 40 and the shaft 18 and that such movement does not cause substantial disturbance of the soil or other material which tends to downgrade the cotton.

It will be seen from the drawings, that each finger 56 is provided with a rounded or spheroid end 66 and that when these fingers engage between the plants and emerge therefrom and due to their flexible character, they do not tend to defoliate the plants to a great extent or to scrap soil into the bolls of cotton lying on the ground. Additionally, it will be seen that the coil springs inside the fingers promote great durability of these rubber-like fingers and further, that in some instances, a slight static charge is built up on the fingers as they are frictionally rotated between the stalks and the cotton bolls and consequently, this tends to provide an attractive surface on which cotton clings temporarily until the fingered rotors have moved a substantial number of degrees at which they clear the ground and the cotton bolls fall therefrom into the furrow. From a disclosure of FIG. 1 of the drawings, it will be seen that the tilted axes of the rotors 58 causes the fingers to clear the ground in the furrow after they have passed downwardly on the surface of the furrow for a short distance thereupon causing the bolls of cotton to become free of the fingers and dropped into the central portion of the furrow subsequent to which the cotton harvester 62 or other equivalent harvester may gather the cotton from the ground.

It will be obvious to those skilled in the art that various modifications of the present invention may be resorted to in a manner limited only by a just interpretation of the following claims.

I claim:

1. In a cotton harvester the combination of: a vehicle disposed to traverse longitudinally of rows of cotton plants; a cotton engaging rotor having an annular row of resilient downwardly diverging plant stalk engaging fingers; first means rotatably mounting and supporting said rotor on said vehicle in position to cause engagement of said fingers with stalks of a cotton plant row in close proximity to the ground and resilient means coupled to said first means and urging said rotor downwardly; said resilient means disposed to permit upward movement of said rotor when it contacts an elevated obstruction.

2. In a cotton harvester the combination of: a vehicle disposed to traverse longitudinally of rows of cotton plants; a cotton engaging rotor having an annular row of resilient downwardly diverging plant stalk engaging fingers; first means rotatably mounting and supporting said rotor on said vehicle in position to cause engagement of said fingers with stalks of a cotton plant row in close proximity to the ground and resilient means coupled to said first means and urging said rotor downwardly; said resilient means disposed to permit upward movement of said rotor when it contacts an elevated obstruction; said first means disposed freely to permit said rotors to be rotatably driven by cotton plant stalks and on the ground.

3. In a cotton harvester the combination of: a vehicle disposed to traverse longitudinally of rows of cotton plants; a cotton engaging rotor having an annular row of resilient downwardly diverging plant stalk engaging fingers; first means rotatably mounting and supporting said rotor on said vehicle in position to cause engagement of said fingers with stalks of a cotton plant row in close proximity to the ground and resilient means coupled to said first means and urging said rotor downwardly; said resilient means disposed to permit upward movement of said rotor when it contacts an elevated obstruction; said first means disposed freely to permit said rotors to be rotatably driven by cotton plant stalks and on the ground; said fingers made of soft rubber-like material.

4. In a cotton harvester the combination of: a vehicle disposed to traverse longitudinally of rows of cotton plants; a cotton engaging rotor having an annular row of resilient downwardly diverging plant stalk engaging fingers; means rotatably mounting and supporting said rotor on said vehicle in position to cause engagement of said fingers with stalks of a cotton plant row in close proximity to the ground; said means disposed freely to permit said rotors to be rotatably driven by cotton plant stalks and on the ground; said fingers made of a soft rubber-like material; a metallic hub for said fingers; flexible spring members fixed to said hub and extending longitudinally and internally of said fingers.

5. In a cotton harvester the combination of: a vehicle disposed to traverse longitudinally of rows of cotton plants; a cotton engaging rotor having an annular row of resilient downwardly diverging plant stalk engaging fingers; means rotatably mounting and supporting said rotor on said vehicle in position to cause engagement of said fingers with stalks of a cotton plant row in close proximity to the ground; said means disposed freely to permit said rotors to be rotatably driven by cotton plant stalks and on the ground; said fingers made of soft rubber-like material; a metallic hub for said fingers; flexible spring members fixed to said hub and extending longitudinally and internally of said fingers; said hub connected to said first mentioned means.

6. In a cotton harvester the combination of: a vehicle disposed to traverse longitudinally of rows of cotton plants; a cotton engaging rotor having an annular row of resilient downwardly diverging plant stalk engaging fingers; means rotatably mounting and supporting said rotor on said vehicle in position to cause engagement of said fingers with stalks of a cotton plant row in close proximity to the ground; said means disposed freely to permit said rotors to be rotatatably driven by cotton plant stalks and on the ground; said fingers made of soft rubber-like material; a metallic hub for said fingers; flexible spring members fixed to said hub and extending longitudinally and internally of said fingers; said hub connected to said first mentioned means; said rotor comprising rubber-like material covering said hub and integral with said fingers.

7. In a cotton harvester the combination of: a vehicle disposed to traverse longitudinally of rows of cotton plants; a cotton engaging rotor having an annular row of resilient downwardly diverging plant stalk engaging fingers; first means rotatably mounting and supporting said rotor on said vehicle in position to cause engagement of said fingers with stalks of a cotton plant row in close proximity to the ground and resilient means coupled to said first means and urging said rotor downwardly;

said resilient means disposed to permit upward movement of said rotor when it contacts an elevated obstruction; said first means having a rotary axis inclined to the vertical and tilted backwardly relative to the movement direction of said vehicle.

8. In a cotton harvester the combination of: a vehicle disposed to traverse longitudinally of rows of cotton plants; a cotton engaging rotor having an annular row of resilient downwardly diverging plant stalk engaging fingers; first means rotatably mounting and supporting said rotor on said vehicle in position to cause engagement of said fingers with stalks of a cotton plant row in close proximity to the ground and resilient means coupled to said first means and urging said rotor downwardly; said resilient means disposed to permit upward movement of said rotor when it contacts an elevated obstruction; said first means having a rotary axis inclined to the vertical and tilted backwardly relative to the movement direction of said vehicle; said rotary axis also tilted away from a respective cotton plant row whereby said fingers engage plant stalks and sloping sides of furrows adjacent thereto.

9. In a cotton harvester the combination of: a vehicle disposed to traverse longitudinally of rows of cotton plants; a cotton engaging rotor having an annular row of resilient downwardly diverging plant stalk engaging fingers; first means rotatably mounting and supporting said rotor on said vehicle in position to cause engagement of said fingers with stalks of a cotton plant row in close proximity to the ground; said fingers disposed to traverse between upstanding stalks of cotton plants in the middle of said row; and second means coupled to said first means and urging said rotor downwardly relative to said vehicle; said second means disposed to permit upward movement of said rotor when it contacts an elevated obstruction.

References Cited by the Examiner
UNITED STATES PATENTS

| | | | |
|---|---|---|---|
| 2,549,185 | 4/51 | Fitch | 171—67 |
| 2,657,408 | 11/53 | Machovec | 56—27X |
| 2,730,855 | 1/56 | Thomas | 56—28 |
| 2,995,884 | 8/61 | Pace | 56—29 |

T. GRAHAM CRAVER, *Primary Examiner.*

RUSSELL R. KINSEY, *Examiner.*